US012493622B2

(12) United States Patent
Srivastava et al.

(10) Patent No.: US 12,493,622 B2
(45) Date of Patent: Dec. 9, 2025

(54) TIME SERIES OF SKETCHES FOR APPROXIMATE QUERY PROCESSING

(71) Applicant: Adobe Inc., San Jose, CA (US)

(72) Inventors: Vijay Srivastava, San Jose, CA (US); Priyam Tejaswin, San Jose, CA (US); Nimish Srivastav, Santa Clara, CA (US); Deepak Pai, Sunnyvale, CA (US); Anish Narang, San Jose, CA (US)

(73) Assignee: ADOBE INC., San Jose, CA (US)

(*) Notice: Subject to any disclaimer, the term of this patent is extended or adjusted under 35 U.S.C. 154(b) by 76 days.

(21) Appl. No.: 18/391,231

(22) Filed: Dec. 20, 2023

(65) Prior Publication Data

US 2025/0209084 A1  Jun. 26, 2025

(51) Int. Cl.
*G06F 16/2458* (2019.01)
*G06F 16/22* (2019.01)
*G06F 16/28* (2019.01)

(52) U.S. Cl.
CPC ...... *G06F 16/2462* (2019.01); *G06F 16/2282* (2019.01); *G06F 16/2477* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 9,928,288 B2 * | 3/2018 | Fourny | G06F 16/283 |
| 2006/0106783 A1 * | 5/2006 | Saffer | G06F 16/9038 |
| | | | 707/E17.093 |
| 2019/0325339 A1 * | 10/2019 | Kotorov | G06F 16/242 |
| 2021/0064592 A1 * | 3/2021 | Yao | G06F 16/2477 |
| 2022/0292101 A1 * | 9/2022 | Mai | G06F 16/24568 |
| 2023/0289330 A1 * | 9/2023 | Pang | G06F 16/283 |
| 2024/0005022 A1 * | 1/2024 | Cook | G06F 16/2456 |

OTHER PUBLICATIONS

Anderson et al. "A High-Performance Algorithm for Identifying Frequent Items in Data Streams", IMC '17: Proceedings of the 2017 Internet Measurement Conference, Nov. 2017, 22 pages.

(Continued)

*Primary Examiner* — Son T Hoang
(74) *Attorney, Agent, or Firm* — Shook Hardy & Bacon L.L.P.

(57) ABSTRACT

Some aspects relate to technologies for generating time series of sketches and using the time series of sketches for approximate query processing. In accordance with some aspects, tabular data is accessed that has a number of columns. Responsive to identifying a first column as comprising numerical data, sketches are generated for the numerical data for each of a number of time steps, and the sketches for the numerical data are stored as a first time series of sketches. Responsive to identifying a second column as comprising categorical data, sketches are generated for the categorical data for each of the time steps, and the sketches for the categorical data are stored as a second time series of sketches. When a query is received, a response to the query is provided using sketches from the first time series of sketches and/or the second time series of sketches.

19 Claims, 9 Drawing Sheets

(56) References Cited

OTHER PUBLICATIONS

Dasgupta et al., "A Framework for Estimating Stream Expression Cardinalities", International Conference on Database Theory, Oct. 2015, 33 pages.

Datasketches, "HyperLogLog Sketch", Online available at: <https://datasketches.apache.org/docs/HLL/HLL.html>, Retrieved on Mar. 2024, 7 pages.

Datasketches, "Original Quantiles Sketch", Online available at: <https://datasketches.apache.org/docs/Quantiles/OrigQuantilesSketch.html>, Retrieved on Mar. 2024, 7 pages.

* cited by examiner

TIME SERIES OF SKETCHES FOR APPROXIMATE QUERY PROCESSING

BACKGROUND

With the enormous amount of data being generated through various online activities, the need for efficient data summarization (also referred to as approximate query processing) to provide real-time (or near real-time) query responses on large datasets has become of particular relevance. Such data summarization is used in a variety of contexts, such as, for instance, configuring intelligent services, automatically checking for data quality, and performing user segmentation, to name a few.

SUMMARY

Some aspects of the present technology relate to, among other things, generating time series of sketches over columns of tabular data and using the time series of sketches to generate results to queries specifying time periods. Given a tabular dataset having a number of records and columns for attributes of the records, each column is processed to generate a time series of sketches for the attribute of that column.

In some aspects, the data for a column is processed differently depending on whether the column comprises numerical data or categorical data. In the case of a column comprising numerical data, bins are determined for dividing the numerical data and generating sketches, where each bin corresponds to a range of numerical values (e.g., 0-10, 11-20, 21-30, etc.). In some aspects, a pre-fix sum approach is used to provide cumulative value bins (e.g., 0-10, 0-20, 0-30, etc.). A sketch is generated for each bin at each of a number of time steps based on records having time information indicating which records correspond to each time step. In the case of a column comprising categorical data, the top-k most frequent values are identified. A sketch is generated for each of the top-k values at each of the time steps based on records having time information indicating which records correspond to each time step. In some aspects, a single sketch is also generated for all other values not in the top-k values at each of the time steps. The time series of sketches are stored in a manner to facilitate retrieval of particular sketches to determine results for queries.

When a query is received, sketches are retrieved from storage and processed to generate a result. The query can be univariate or multivariate and specifies a time period. If univariate, the single predicate in the query is determined. If multivariate, the query is broken into individual predicates. Additionally, time step(s) corresponding to the time period specified by the query are determined. For each individual predicate from the query, sketches are retrieved based on the predicate for each time step corresponding to the time period. A result is determined from the retrieved sketches, and a response to the query is returned based on the result.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Definitions

Figure 1:
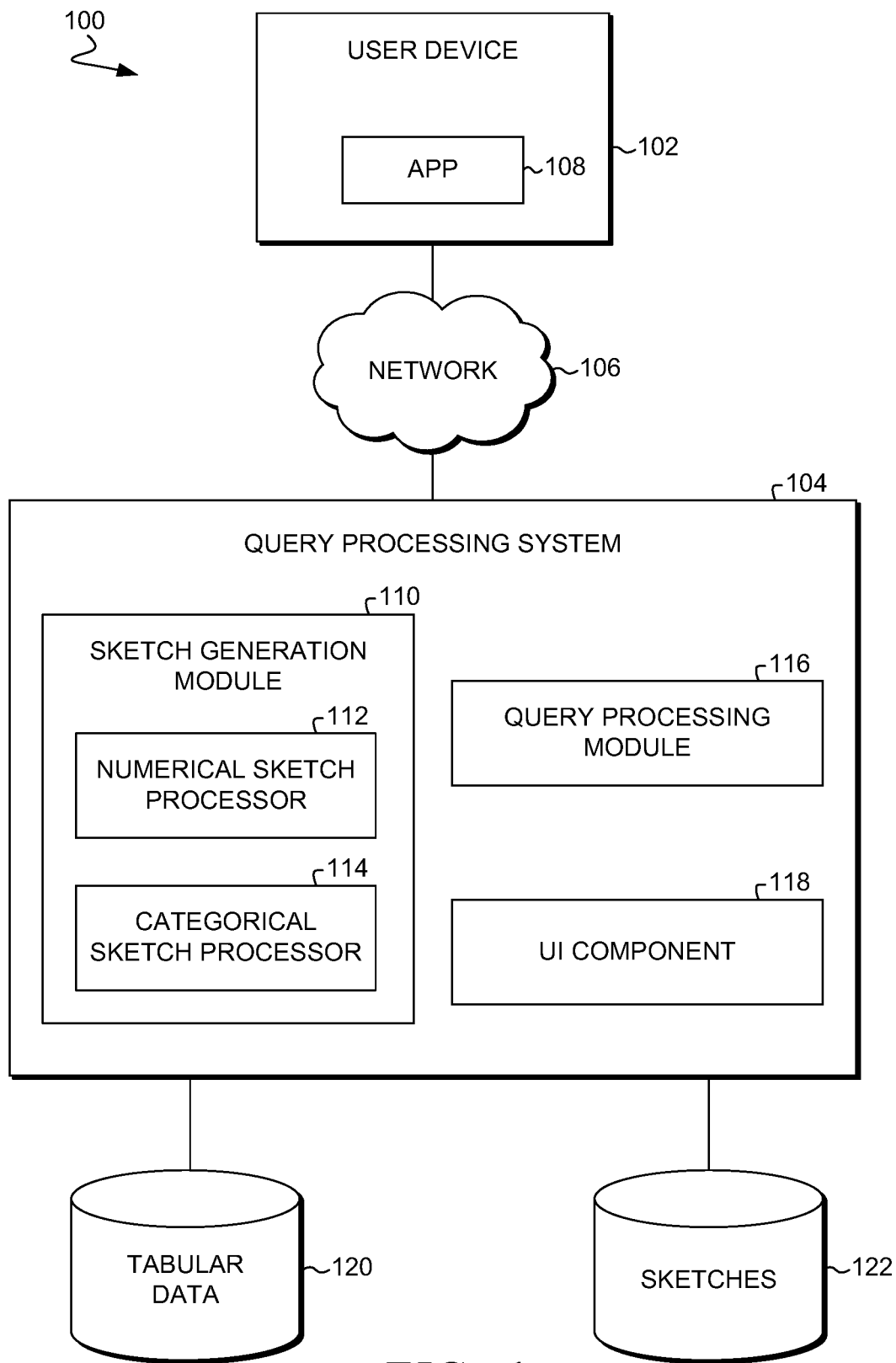
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, "tabular data" refers to structured data that can be represented as a table in rows and columns. In some aspects, each row corresponds to a record, and each column corresponds to an attribute.

A "row" or "record" is a collection of information for a single observation, event, entity, or item. A record comprises a data set that includes information for attributes for the tabular data.

An "column" or "attribute" corresponds to a characteristic, feature, or property within a schema of the data. A column can comprise either numerical data or categorical data.

"Numerical data" comprises data values in the form of numbers, including discrete values (e.g., number of items in a set, or birth year) or continuous values (e.g., temperature). A numerical column/attribute refers to a column/attribute having numerical data.

"Categorical data" comprises data values in the form of names or labels (e.g., country of origin, or operating system). A categorical column/attribute refers to a column/attribute having categorical data.

A "data element" comprises a value of a given attribute for a given record in tabular data. In some instances, a data element corresponds to the intersection of a record/row and an attribute/column in the tabular data.

As used herein, a "sketch" refers to a data structure or algorithm used for approximate computation or estimation of certain attributes of datasets.

A "time series of sketches" refers to a collection of sketches generated in accordance with aspects of the technology described herein in which a sketch is provided for each of a number of times steps.

A "time step" is a discrete unit of time for which a sketch is generated. In various aspects of the technology described herein, the time step can be at any of a variety of different time granularities (e.g., hourly, daily, weekly, monthly, yearly, etc.).

A "bin" refers to a range of values for numerical data. A bin can be defined by "bin boundaries" that indicate a lower-end value and an upper end value for the bin.

A "predicate" refers to an expression that includes a variable (corresponding to an attribute), an operator, and a value. For instance, for the predicate "age<30", the variable is "age", the operator is "<", and the value is "30".

Overview

Running queries over large datasets poses challenges in providing near real-time and accurate results. The queries could be, for instance, any arbitrary combination of predicates, univariate or multivariate, supporting a large gamut of operators. As an example, a query could be: "Number of people meeting following conditions: Having AGE>35; Residing in a COUNTRY IN ('US', 'CHINA', 'INDIA'); and Has performed an event between EVENT_TIME> {T1} & EVENT_TIME< {T2}." The predicates included in queries could use a variety of different operators, including, for instance, "greater than", "less than", "equals", "not equals", "in", and "not in". The problem of processing these queries becomes harder to solve when the responses are needed in near real-time. This is further aggravated by the size of datasets. Going over the entire data for every query is impractical due to the time required to process the queries. Several summarization approaches have been developed in an attempt to provide more efficient data summarization and real-time query retrieval. The following provides a discussion of a number of existing query processing solutions and their shortcomings.

No Summaries: In this approach, when a query is initiated on a dataset, the entire dataset is loaded (e.g., in a spark data-frame), and the query is run on the data. While this approach provides exact results for any query, univariate or multivariate, using any supported operations on given datatypes, there is no guarantee of a real-time response when performing the queries over large datasets.

Sampling: Another simple solution is to store a subset of the dataset and run the query only on this subset (as opposed to the entire dataset). If the subset is small enough, the query can be run in real time and give an approximate response. The response is an approximate as it might have errors from sampling. Further, the approach can support any query, univariate or multivariate, using any supported operations on given datatypes. However, the sampling presents a possibility of providing inaccurate results. For instance, if there are events in the datasets that occur less frequently, the subset of data stored might miss all instances of those events. Therefore, an 'empty' result could be returned for queries containing predicates for those events. The only way to mitigate this problem is to increase the sample size such that some samples from these low-frequency events are also captured. This larger sample size would add to compute-time for query-answering, thus taking away from the real-timely-ness of this approach. Additionally, there is a need to keep updating the sample when new data is ingested.

Univariate Histogram Summaries: Another current solution is to store univariate histograms containing counts of events pertaining to each of a number of histogram bins. The data stored in each histogram bin is an integer value counting the number of times the event corresponding to that bin appeared in the dataset. This type of a solution guarantees real-time responses to any univariate query and supported operators on these, using the summary histograms computed only once. If the histograms are computed on sub-samples, there would be a sampling error, otherwise exact counts for univariate queries can be retrieved. However, this approach fails entirely for multivariate queries. As these histograms only contain counts for univariate events, there is no way to retrieve any joint distribution just by leveraging these univariate histograms. While the histogram approach can be extended to multivariate histograms, the problem scales exponentially with the data-dimensions as that approach needs an order of as many histograms as all possible combination or values taken by each feature. This leads to issues with efficiently storing these summaries in memory, making this approach nonviable.

Theta and Quantile Sketch Based Technique: Another approach uses sketching algorithms for data summarization and query answering. In this work, Theta sketches are used to summarize categorical data as is. A Theta sketch is maintained for each unique value in a categorical column. For numerical data, a huge sketch is maintained that stores hashes against the actual feature value. Along with these, this approach also stores several quantile sketches per numerical feature to efficiently retrieve corresponding value of a quantile at the time of query. This approach is suitable to answer queries that support only a few quantiles that can be maintained in as many quantile sketches per numerical feature. However, there are several limitations of this approach: 1. For categorical data, storing a sketch for all values, including low frequency values leads to a large memory footprint. 2. For numerical data, the approach is suited for quantile-based queries but not value-based queries. While huge sketches can be used, searching for the value to cut-off at in the array of actual feature values would make the response slow. 3. This approach only deals with datasets that are static and have only one snapshot.

HyperLogLog Sketch Based Techniques: Similar explorations have been made using HLL (HyperLogLog) sketches for discretized data. HLL sketches have a smaller memory footprint than Theta Sketches. However, HLLs do not inherently support operations like set intersection and difference with bounded errors.

Aspects of the technology described herein improve the functioning of the computer itself in light of these shortcomings in existing approaches for query processing by providing a solution that supports real-time (or near-time) approximate query processing using time series of sketches. A time series of sketches comprises a collection of sketches generated over data for each of a number of times steps, where each time step is some unit of time (e.g., a day, a week, a month, a year, etc.).

In accordance with some aspects of the technology described herein, a dataset is processed to generate time series of sketches. The dataset can be in the form of tabular data having rows (i.e., records) and columns (i.e., attributes for each record). One attribute of the tabular data is time information that indicates when an event associated with a record occurred. This time information allows records to be identified as corresponding to particular time steps to facilitate generating sketches over the data for each time step.

Given tabular data, each column is processed to generate a time series of sketches for the attribute of the column. Note that reference to "each column" herein is not intended to imply that all columns are processed, but instead, that the columns that are processed are done so individually to provide a time series of sketches for each processed column. For instance, in some aspects, only a subset of columns for attributes of interest could be processed to generate sketches for each of those attributes of interest.

Sketches are generated for a column based on the type of data values of the column. For a column with numerical data, bins are determined for dividing the numerical data, and sketches are generated for each bin at each time step. A bin corresponds to a range of numerical values between two bin boundaries. In some aspects, the bins are non-overlapping (e.g., 0-10, 11-20, 21-30, etc.). In some aspects, the bins are overlapping. For instance, a pre-fix sum approach is used in some configurations to provide cumulative value bins (e.g., 0-10, 0-20, 0-30, etc.). A sketch is generated for each bin at each time step based on records having time information indicating which records correspond to each time step. The granularity of the time steps (e.g., hourly, daily, weekly, monthly, yearly, etc.) is configurable.

For a column comprising categorical data, the top-k (where the number k is configurable) most frequent values are identified. The top-k values can be determined over all data for the column (i.e., across time steps) or can be determined at each time step. A sketch is generated for each of the top-k values at each time step (providing k sketches at each time step) based on records having time information indicating which records correspond to each time step. In some aspects, a single sketch is also generated for all other values not in the top-k values at each time step.

The time series of sketches for each column/attribute are stored in a manner to facilitate retrieval of particular sketches to determine results for queries. For instance, in some aspects, sketches for numerical data are stored using: a column/attribute identifier, a bin identifier, and a time step identifier. In some aspects, sketches for categorical data are stored using: a column/attribute identifier, an attribute value identifier, and a time step identifier.

When a query is received, sketches are retrieved from storage and processed to generate a result. The query can be univariate or multivariate and specifies a time period. If univariate, the single predicate in the query is determined. If multivariate, the query is broken into individual predicates. Additionally, time step(s) corresponding to the time period specified by the query are determined. For each individual predicate from the query, sketches are retrieved based on the predicate for each time step corresponding to the time period. A result is determined from the retrieved sketches, and a response to the query is returned based on the result.

Aspects of the technology described herein provide a number of improvements over existing query processing technologies. For instance, the technology described herein enables approximate query processing that provides real-time or near real-time results with high accuracy even when dealing with very large datasets. The technology described herein can process univariate or multivariate queries containing any operator using both numerical and categorical data. Additionally, the generation of time series of sketches using event timestamps facilitates providing approximate results for query-specified time periods, providing more value than just providing approximate results over a single snapshot. The sketch generation approach is also flexible, allowing sketches to be updated over time as batches of data are ingested. Further, the setup enables answering feature-value based queries faster while also ensuring a manageable memory footprint.

Example System for Approximate Query Processing Using Time Series of Sketches

With reference now to the drawings, FIG. 1 is a block diagram illustrating an exemplary system 100 for generating time series of sketches and using the sketches for approximate query processing in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and a query processing system 104. Each of the user device 102 and the query processing system 104 shown in FIG. 1 can comprise one or more computer devices, such as the computing device 900 of FIG. 9, discussed below. As shown in FIG. 1, the user device 102 and the query processing system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of user devices and servers can be employed within the system 100 within the scope of the present technology. Each can comprise a single device or multiple devices cooperating in a distributed environment. For instance, the query processing system 104 could be provided by multiple server devices collectively providing the functionality of the query processing system 104 as described herein. Additionally, other components not shown can also be included within the network environment.

The user device 102 can be a client device on the client-side of operating environment 100, while the query processing system 104 can be on the server-side of operating environment 100. The query processing system 104 can comprise server-side software designed to work in conjunction with client-side software on the user device 102 so as to implement any combination of the features and functionalities discussed in the present disclosure. For instance, the user device 102 can include an application 108 for interacting with the query processing system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the query processing system 104 remain as separate entities. While the operating environment 100 illustrates a configuration in a networked environment with a separate user device and query processing system, it should be understood that other configurations can be employed in which components are combined. For instance, in some configurations, a user device can provide query processing capabilities described in conjunction with the query processing system.

The user device 102 can comprise any type of computing device capable of use by a user. For example, in one aspect, the user device can be the type of computing device 900 described in relation to FIG. 9 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user can be associated with the user device 102 and can interact with the query processing system 104 via the user device 102.

The query processing system 104 processes data, for instance, tabular data from a tabular data store 120, to generate time series of sketches, which are stored in the sketches data store 122. The query processing system 104 uses the stored sketches to perform approximate query processing in real time with high confidence. As shown in FIG. 1, the query processing system 104 includes a sketch generation module 110 (including a numerical sketch processor 112 and a categorical sketch processor 114), a query processing module 116, and a user interface component 118. The components of the query processing system 104 can be in addition to other components that provide further additional functions beyond the features described herein. The query processing system 104 can be implemented using one or more server devices, one or more platforms with corresponding application programming interfaces, cloud infrastructure, and the like. While the query processing system 104 is shown separate from the user device 102 in the configuration of FIG. 1, it should be understood that in other configurations, some or all of the functions of the query processing system 104 can be provided on the user device 102.

In one aspect, the functions performed by components of the query processing system 104 are associated with one or more applications, services, or routines. In particular, such applications, services, or routines can operate on one or more user devices, servers, can be distributed across one or more user devices and servers, or be implemented in the cloud. Moreover, in some aspects, these components of the query processing system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The sketch generation module 110 of the query processing system 104 processes tabular data, for instance, from the tabular data store 120, to generate time series of sketches of the data. The tabular data comprises structured data that can be represented as a table in rows and columns. Each row corresponds to a record that comprises a collection of data for a single observation, event, entity, or item. Each column corresponds to an attribute of the tabular data. A column can comprise either numerical data or categorical data. Numerical data comprises data in the form of numbers, including discrete or continuous values. Categorical data comprises data in the form of names or labels. A data element comprises a data value of a given attribute for a given record in the tabular data.

In accordance with aspects of the present technology, time data is one attribute of the tabular data. The time data for a record can comprise, for instance, a timestamp associated with the record. For instance, a record can correspond with some event (e.g., a user visiting a particular web page), and the time data for the record reflects the time at which that event occurred. The time data stored as part of records in the tabular data can be at any level of granularity, such as, for instance, years, months, days, hours, minutes, seconds, etc.

The time data is used by the sketch generation module 110 to identify records in the tabular data that correspond with different time steps for generating sketches at each time step in order to provide of time series of sketches. The time steps at which sketches are generated can be at any level of granularity, such as, for instance, years, months, days, hours, minutes, seconds, etc. For instance, in the case in which the sketch generation module 110 generates daily series of sketches, the records of the tabular data are grouped together by day to generate the sketches for each day.

The sketch generation module 110 can include a data job processor (not shown in FIG. 1) that causes batches of data to be retrieved from the tabular data store 120 for generating sketches from the retrieved data. For a given column of data, the data job processor determines whether the column comprises numerical data or categorical data. If the column comprises numerical data, the data is provided to the numerical sketch processor 112, which generates a time series of sketches from the numerical data for that column. Alternatively, if the column comprises categorical data, the data is provided to the categorical sketch processor 114, which generates a time series of sketches from the categorical data for that column.

The numerical sketch processor 112 divides the numerical data for a column into a number of bins, and for each time step, the numerical sketch processor 112 generates a sketch for each bin. A bin represents a range of numerical values between two bin boundaries. In accordance with some aspects, the numerical sketch processor 112 uses a pre-fix sum approach in which the bins are cumulative. For instance, given an overall range of values from 0-100 and 10 equal-width bins, the bins could comprise: 0-10, 0-20, 0-30, etc. Using cumulative bins can provide for relatively more efficient approximate query processing. In some aspects, the numerical sketch processor 112 uses non-cumulative bins. For instance, given an overall range of values from 0-100 and 10 equal-width bins, the bins could comprise: 0-10, 11-20, 21-30, etc.

The numerical sketch processor 112 divides numerical data for a column into bins using any of a number of different approaches within the scope of the technology described herein. In various aspects, the numerical sketch processor 112 uses equal-width bins, variable-width bins, or a combination thereof. Given a dataset with columns having different value ranges and distributions, the numerical sketch processor can vary the number of bins and the width (i.e., data range) of the bins across the different columns. In some aspects, the numerical sketch processor 112 determines bins for a column when processing an initial batch of data for the column and uses those bins when subsequently processing other batches of data for the column.

By way of example only and not limitation, the following describes the determination of bins for a column of numerical data in accordance with some aspects of the technology described herein. When processing an initial batch of data for a column of numerical data, the numerical sketch processor 112 identifies the minimum value and maximum value for the column and computes the bin width for equal-width bins as (maximum value-minimum value)/(number of bins). In some aspects, a lower-end bin is also used for values below the minimum value (i.e., lower values that may appear when processing subsequent batches of data for the column), and an upper-end bin is used for values above the maximum value (i.e., higher values that may appear when processing subsequent batches of data for the column). In further aspects, a NULL bin is used to capture records have a null value for the column.

In some aspects, the numerical sketch processor 112 also determines a second set of bins (referred to herein as delta bins), in which the bin boundaries of the delta bins are offset from the bin boundaries of the initial set of bins. In some aspects, a delta value is applied to the bin width of the initial set of bins to determine the bin boundaries of the delta bins. For instance, given a delta value of 0.5 and a bin width of 10, the bin boundaries of the delta bins would be offset by 5 from the bin boundaries of the initial bins. As such, given initial bins of 0-10, 11-20, 21-30, etc.; the delta bins could comprise 5-15, 16-25, 26-35, etc.

Based on the bins for a column of numerical data, the numerical sketch processor 112 generates a sketch for each bin at each time step. In some aspects, the sketch generated by the numerical sketch processor 112 for each bin at each time step comprises a Theta sketch. When processing an initial batch of numerical data for a column, the numerical sketch processor 112 generates a sketch for each bin for each time step. The sketch for a given bin and time step is generated from records with time data within the time step and that have a numerical value for the attribute of the column that is within the bin range of the given bin. When processing subsequent batches of data, the numerical sketch processor 112 generates the sketches by updating existing sketches based on records in the new batches of data that fall into each bin and each time step. When new time steps are encountered in subsequent batches of data, the numerical sketch processor 112 generates new sketches for those time steps.

The sketches for the numerical data generated by the numerical sketch processor 112 are stored in a sketches data store 122. Any suitable storage method can be used that facilitates retrieving the sketches for processing responses to queries. In some aspects, each sketch for the numerical data is uniquely identified in the sketches data store to facilitate retrieval of particular sketches for generating responses. For instance, in some aspects, each sketch from numerical data is identified by: a column identifier (e.g., name or index in the tabular data schema, such as "age"), a time step identifier (e.g., "dayofyear=10_1_2023"), and a bin identifier (e.g., bin boundaries providing a numerical range for the bin) or NULL identifier (for NULL values).

Figure 2:
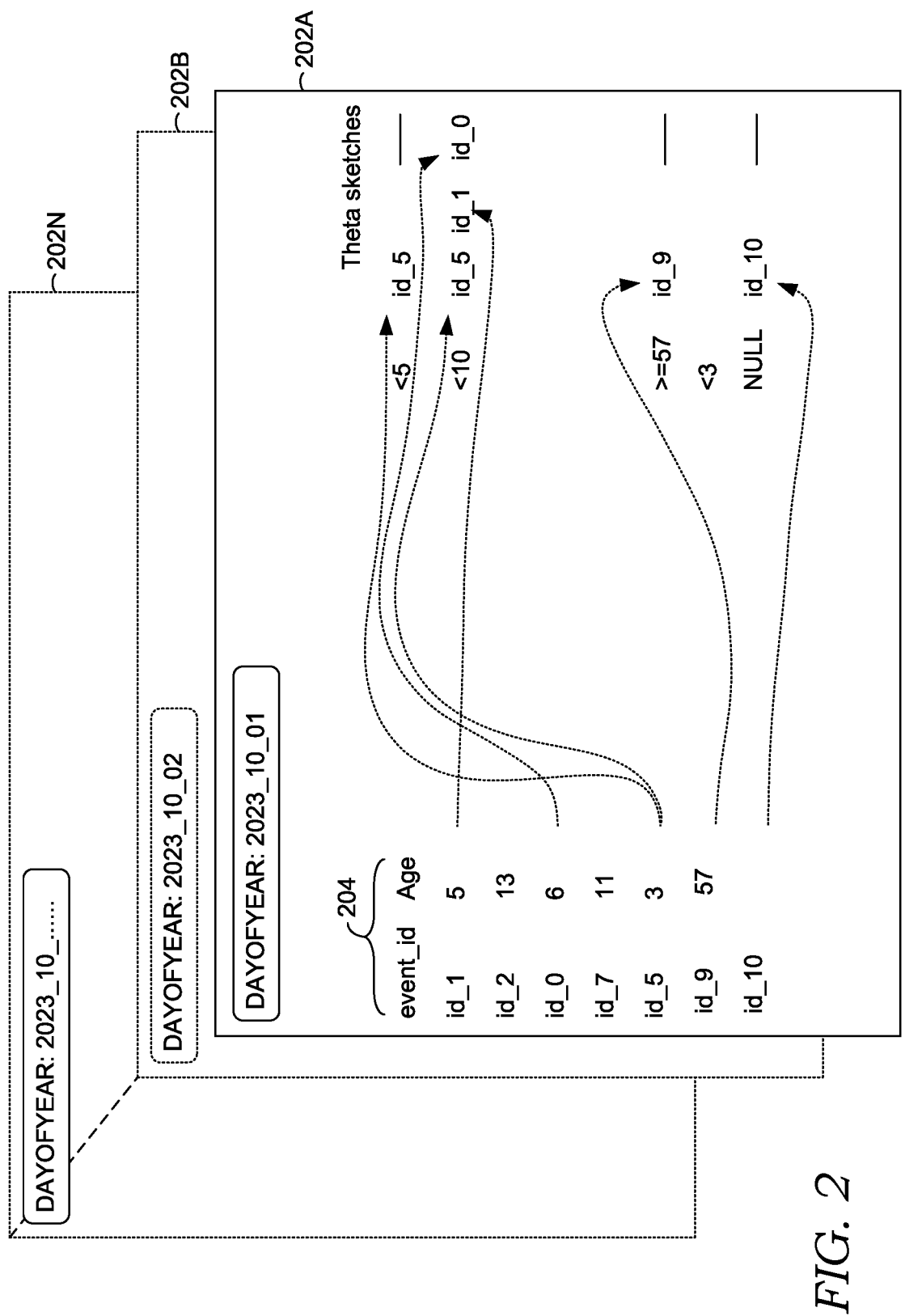
FIG. 2 is a diagram illustrating a time series of sketches for numerical data in accordance with some implementations of the present disclosure.

FIG. 2 provides an example of a time series of Theta sketches generated for numerical data corresponding with "age" values. In particular, the example of FIG. 2 provides a time series of Theta sketches in which each time step corresponds with a day. For instance, Theta sketches have been generated for N time steps, including: a first time step 202A corresponding with "dayofyear=2023_10_01", a second time step 202B corresponding with "dayofyear=2023_10_02", etc. through a Nth time step 202N. To generate the Theta sketches for a given time step, records having time information corresponding with that given time step are identified and used to generate the Theta sketches for that time step. For instance, FIG. 2 shows records 204 that have time information corresponding with the time step: dayofyear=2023_10_01. In this example, cumulative bins have been determined with a bin width of 5 (e.g., bins include <5, <10, <15, <20, etc.) with a lower-end bin of <3, an upper-end bin of >=57, and a null bin. As shown in FIG. 2, the Theta sketch for each bin for the first time step 202A is generated based on records having age values that fall within the bin range for each bin. For instance, the Theta sketch for the bin <10 is generated from the records: id_5, id_1, and id_0, as those records have age values that are less than 10.

With reference again to FIG. 1, the categorical sketch processor 114 generates time series of sketches for columns of the tabular data that comprise categorical data. Given the categorical data for a column, the categorical sketch processor 114 determines the top-k most frequent values in the data. The k number of values to identify as top values is configurable. Identification of the top-k values can be done for each time step or across time steps. In some aspects, the categorical sketch processor 114 identifies the top-k values by accessing all data for the column and determines the frequency for each value. In some aspects, the categorical sketch processor 114 identifies the top-k values by generating an item sketch over the data from the column (e.g., using an ItemSketch function) that approximates a frequency with which each value occurs in the column (or records corresponding to a given time step in the event that top-k values are determined on a per time step basis).

The categorical sketch processor 114 generates a sketch for each of the top-k values at each time step. In other words, the categorical sketch processor 114 generates k sketches at each time step-one sketch for each of the k values. In some aspects, the categorical sketch processor 114 also generates an "other" sketch at each time step based on data records have values in the column that are not one of the top-k values. In some aspects, the categorical sketch processor 114 also generates a NULL sketch at each time step based on data records having a null value in the column. The sketch generated by the categorical sketch processor 114 for each k-value, other values, and/or null value at each time step can comprise, for instance, a Theta sketch.

When processing an initial batch of categorical data for a column, the categorical sketch processor 114 generates a new sketch for each k-value, other values, and NULL values for each time step. The sketch for a given top-k value and time step is generated from records with time data within the time step that have a value for the attribute of the column that matches that top-k value. The sketch for the other values at a given time step is generated from records with time data within the time step that have a value for the attribute of the column that does not match any of the top-k values. The sketch for NULL values at a given time step is generated from records with time data within the time step that have a NULL value for the attribute of the column.

When processing subsequent batches of data, the categorical sketch processor 114 generates the sketches by updating existing sketches based on records in the new batches of data that fall into each categorical value and each time step. When new time steps are encountered in subsequent batches of data, the categorical sketch processor 114 generates new sketches for those time steps.

The sketches for the categorical data generated by the categorical sketch processor 114 are stored in the sketches data store 122. Any suitable storage method can be used that facilitates retrieving the sketches for processing responses to queries. In some aspects, each sketch is uniquely identified in the sketches data store to facilitate retrieval of particular sketches for generating responses. For instance, in some aspects, each sketch from categorical data is identified by: a column identifier (e.g., name or index in the tabular data schema, e.g., "country"), a time step identifier (e.g., "dayofyear=10_1_2023"), and attribute value identifier (e.g., a value for each top-k values (e.g., "US") and "other" for other values not in the top-k) or NULL identifier (for NULL values).

Figure 3:
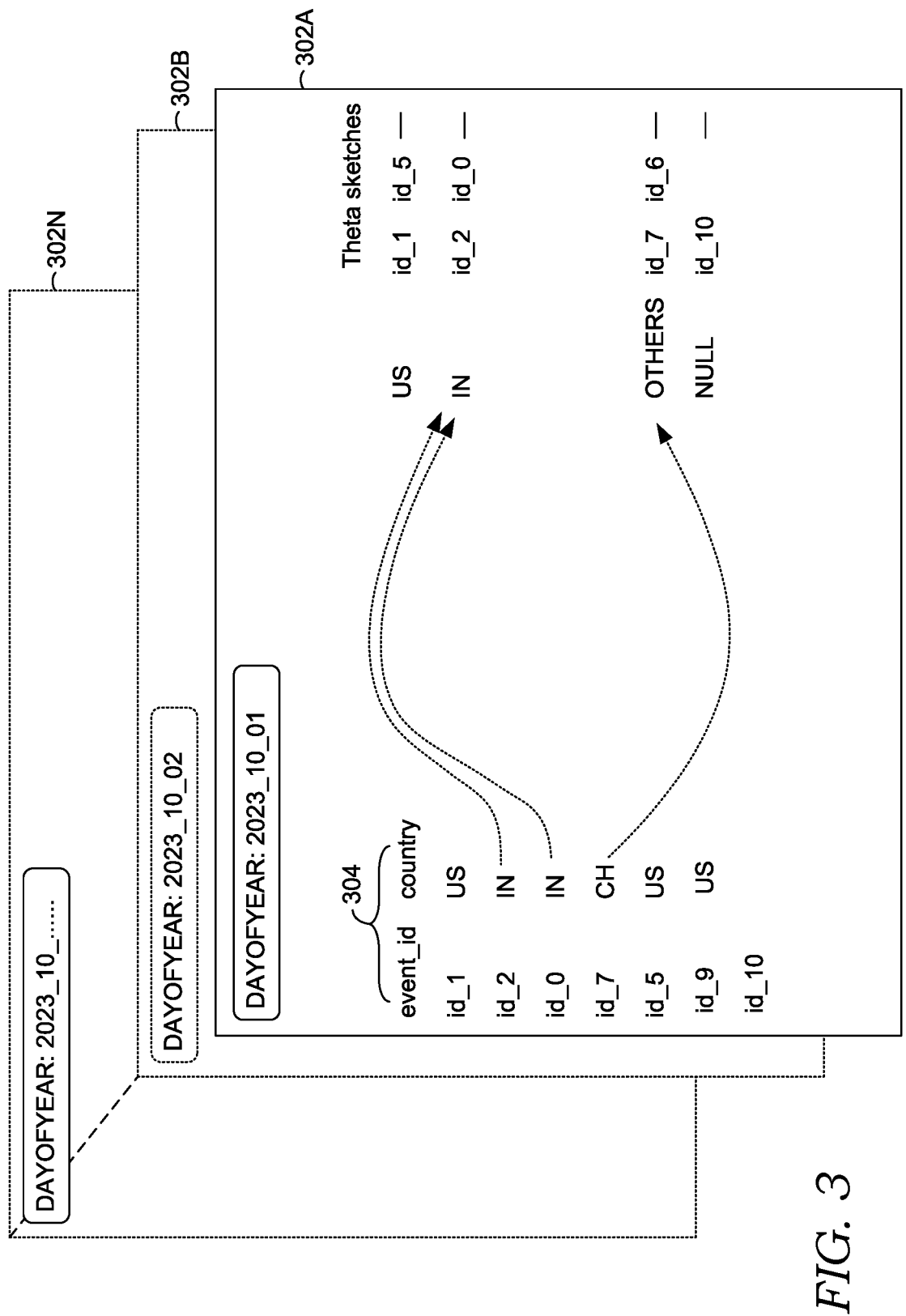
FIG. 3 is a diagram illustrating a time series of sketches for categorical data in accordance with some implementations of the present disclosure.

FIG. 3 provides an example of a time series of Theta sketches generated for categorical data corresponding with "country" values. In particular, the example of FIG. 3 provides a time series of Theta sketches in which each time step corresponds with a day. For instance, Theta sketches have been generated for N time steps, including: a first time step 302A corresponding with "dayofyear=2023_10_01", a second time step 302B corresponding with "dayofyear=2023_10_02", etc. through a Nth time step 302N. To generate the Theta sketches for a given time step, records having time information corresponding with that given time step are identified and used to generate the Theta sketches for that time step. For instance, FIG. 3 shows records 304 that have time information corresponding with dayofyear=2023_10_01. In this example, "US" and "IN" have been determined to be top-k values, while "CN" has not. As such, a Theta sketch is generated for each of the "US" and "IN" values based on records with those values, while a Theta sketch is generated for "other" values, based on record with non-top-k values, including "CN."

Turning again to FIG. 1, the query processing system 104 further includes a query processing module 116 that processes queries submitted to the query processing system 104 using sketches stored in the sketches data store 122. Generally, the query processing module 116 receives a query, for instance, from the user device 102, that includes one or more predicates and a time period. Based on the query, the query processing module 116 retrieves, from the sketches data store 122, sketches that correspond to the predicate(s) for times steps that satisfy the time period specified by the query. The query processing module 116 generates a response from the retrieved sketches to provide a response to the query.

In the case in which the query is univariate, the query processing module 116 retrieves sketches for the predicate specified in the query for the time steps that satisfy the time period specified by the query. In the case in which the query is multivariate, the query processing module 116 divides the query into individual predicates and retrieves sketches for the individual predicates for time steps that fall within the time period specified by the query.

In some aspects, the time series of sketches are used by the query processing module 116 to provide approximate counts of records for any arbitrary query on column values and supported operators (e.g., equals, less than, greater than, etc.) in a dataset during a specified time period between two points in time (start event-time and end event-time). By way of example to illustrate, a multivariate query corresponding to a target-population could be:
Number of People Meeting the Following Conditions:
  Having AGE>35
  Residing in a COUNTRY IN ('US', 'CHINA', 'INDIA')
  Has performed an event between EVENT_TIME> {T1} & EVENT_TIME< {T2}
where T1 and T2 are start event time and end event time, respectively.

The query processing module 116 breaks this query into individual predicates, each accompanied with the start event-time and end event-time, as show below:
  1. AGE<35 and EVENT_TIME> {T1} AND EVENT_TIME< {T2}
  2. COUNTRY in ('US', 'CHINA', 'INDIA') and EVENT_TIME> {T1} AND EVENT_TIME< {T2}

In some aspects, the query processing module 116 retrieves sketches for each predicate using identifiers determined based on the predicates. In the case of numerical data, the query processing module 116 can retrieve sketches using: the column identifier for the attribute in the predicate; one or more bin identifiers for bin(s) corresponding to the value specified by the predicate; and time step identifiers corresponding to the time steps satisfying the time period in the query. For instance, using the above example, sketches would be retrieved for the first predicate using: the column identifier for the "AGE" attribute; the bin identifier(s) for bin(s) based on the operator and value of the predicate (here, the value range under 35); and time step identifiers for time steps between T1 and T2. In some cases, sketches for multiple bin ranges can be retrieved depending on the bins for which sketches have been generated and the value specified by the predicate. For instance, suppose the query specified an age range between 30 and 40 and the bins for the sketches include 0-10, 0-20, 0-30, 0-40, etc. In that case, the sketches for the 0-30 bin and the 0-40 could be retrieved to generate a response for the queried range.

In the case of categorical data, the query processing module 116 can retrieve sketches using: the column identifier for the attribute in the predicate; the attribute value(s) specified by the predicate; and time step identifiers for the time steps satisfying the time period. For instance, using the above example, sketches would be retrieved for the second predicate using the column identifier for the "COUNTRY" attribute; attribute value identifiers based on the operator and values of the predicate (here, "US", "CHINA", and "INDIA"); and time step identifiers for the time steps between T1 and T2. In the event of an attribute value that is a top-k attribute, the sketches for that attribute value would be retrieved. In the event of an attribute that is not a top-k attribute, the sketches for the "other" values or nothing would be retrieved depending on the form of the query being processed.

The query processing module 116 can process any arbitrary query by: dividing the query into a set of univariate predicates; using the univariate predicates and time steps of the time period specified by the query to uniquely identify a set of sketches to retrieve from the sketches data store 122; processing those sketches as per the query conditions; and returning an answer based on processing the sketches. The query processing module 116 can process queries involving predicates having any arbitrary operators. The following provides some specific examples of processing queries using sketches for categorical data and numerical data.

Categorical Data: For illustration purposes only and not limitation, the following provides a discussion of processing some operators for categorical data to generate a result:

=operator: For every time step between the start event-time and the end event-time, the Theta sketches for the column are retrieved where the value is equal to the given value when the value is in the top-k values. On time steps in which the value is not in the top-k values, nothing (e.g., an empty Theta sketch) may be retrieved. To combine the Theta sketches, a union over all these Theta sketches is taken and the unified Theta sketch object is provided as a response.

Belongs in a list operator: For each element of the list, the '=' operator is applied between the start event-time and end-event time as above to get Theta sketches for each individual value in the list. A union is then taken over all these Theta Sketches, and the unified Theta sketch is provided as a response.

Contains/Startswith/Endswith operator: For every time step between the start-event time and end-event time, the Items sketches for the column is retrieved. From this collection of Items sketches, all values are collected that meet the string condition as per the operator, and a list is created of all unique high-frequency values thus seen over all the time steps. The 'Belongs in list' operator is applied as per above, and the unified Theta Sketch is provided as a response.

Numerical Data: For illustration purposes only and not limitation, the following provides a discussion of processing some operators for numerical data to generate a result:

<operator: If the value accompanying this operator is either a bin boundary or a bin boundary+delta value, the Theta sketches corresponding to this bin over all time steps from start-event time to end-event time are retrieved, and a union is take over the Theta sketches to provide a unified Theta Sketch as a response.

If the value is any value other than a bin boundary or bin boundary+delta value, the nearest bin boundary or bin boundary+delta value is identified and the corresponding Theta sketches are retrieved. This might introduce some errors, but these errors are acceptable as the process is providing an approximation. Experiments using the technology described herein on real world datasets has demonstrated that these errors are miniscule.

>operator: A unified Theta sketch is found over all time steps from start-event time to end-event time solving for the same value as with this operator but for '<' operator as above. The new sketch is referred to herein as V. A union of sketches is also retrieved over all time steps from T1 to T2 corresponding to the last bin for this attribute. This new sketch is referred to herein as U. The last bins contain summaries for all the values seen in the model. A result is determined by finding the set difference of the unified sketches over the last bin from unified sketches for '<' operator, i.e. U-V.

=operator: The following assumes that the distribution of values within a bin is uniform, i.e. the number of values within one neighborhood, with width 'w', within that bin would be the same for any other neighborhood with the same width 'w' within that bin. The process finds the bin where the value with this operator belongs in, V. Using this bin's index, the bin from the delta shifted set of Theta sketches, S, is retrieved. This provides two Theta sketches: one corresponding to the actual bin boundaries (V), and the other corresponding to the delta shifted boundaries(S). A set difference is determined between these two Theta sketches, i.e. S-V. This provides the values in the D width delta neighborhood within this bin. Since this D is miniscule, the result of this set difference can be used as an approximate for the values held at the value accompanying this operator.

<=operator: A result for this operator comprises a union between the solutions of '<' operator and '=' operator.

>=operator: A result for this operator comprises a union between the solutions of '>' operator and '=' operator.

Each of the above examples for individual predicates returns an intermediate Theta Sketch—i.e., an intermediate sketch is provided for each of the individual predicates. The answer to the query would be found by combining the intermediate Theta sketches according to the query. For instance, combining the intermediate Theta sketches includes: taking an intersection between the intermediate Theta sketches when an 'AND' operator combines the predicates in the query; and taking a union between the intermediate Theta sketches when an 'OR' operator combines the predicated in the query. This provides a final sketch. A count of elements in that final sketch is determined and provided as a result in response to the query.

The query processing system 104 further includes a user interface component 118 that provides one or more user interfaces for interacting with the query processing system 104. The user interface component 118 provides one or more user interfaces to a user device, such as the user device 102. In some instances, the user interfaces can be presented on the user device 102 via the application 108, which can be a web browser or a dedicated application for interacting with the query processing system 104. For instance, the user interface component 118 can provide user interfaces for, among other things, interacting with the query processing system 104 to submit queries. The user interface component 118 can also provide user interfaces for presenting results for the queries and allowing a user associated with a user device to interact with the results.

Figure 4:
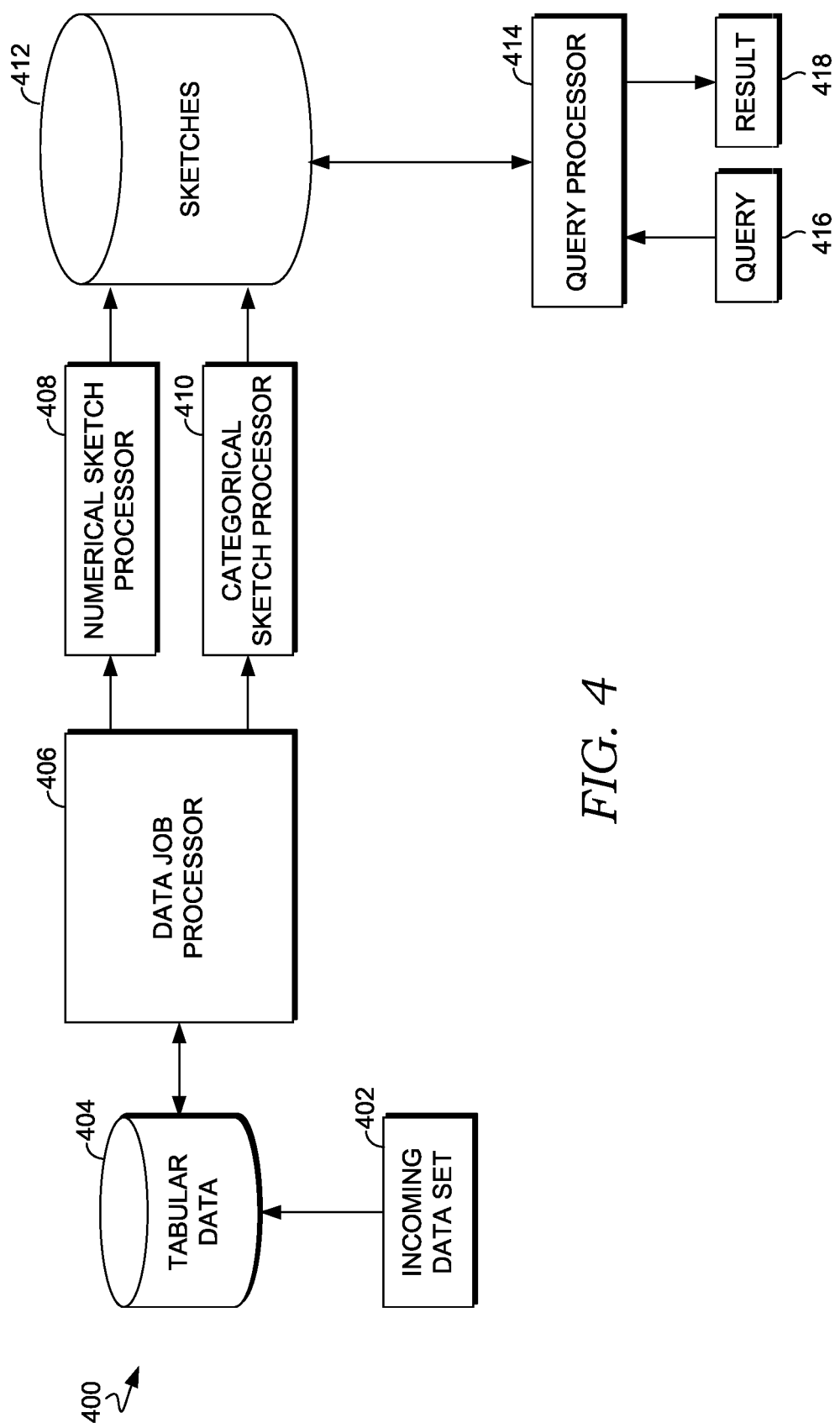
FIG. 4 is a block diagram showing an example process for generating time series of sketches and using the sketches to generate results for queries in accordance with some implementations of the present disclosure.

With reference now to FIG. 4, a block diagram is provided that illustrates an example process 400 for generating a time series of Theta sketches and employing the Theta sketches for processing queries that could be performed, for instance, by the query processing system 104 of FIG. 1. As shown in FIG. 4, when an incoming data set 402 is received, data from the data set 402 is processed and stored in the tabular data store 404. This can include, for instance, generating tabular data given a first batch of data or adding new records to the tabular data given subsequent batches. As will be described in further detail below, tabular data from the tabular data store 404 is processed to generate a time series of Theta sketches. When the very first batch of data is processed, the summarization models are set up and initial Theta sketches are computed. On subsequent batches, the Theta sketches are updated using the subsequent data.

A data job processor 406 periodically accesses batches of data from the tabular data store 404 for processing. When a processing job is triggered, the data job processor 406 checks the datasets added to the tabular data 404. Each dataset can have one or more batches of data. The data job processor 406 checks whether each of these batches have been processed in one of the prior runs. If a batch has already been processed, the batch is not reprocessed. For a batch that has not been processed yet, the data job processor 406 prepares the data for processing. In some aspects, the data job processor 406 converts time information to a particular granularity (e.g., "hourofday", "dayofyear", etc.) based on the granularity of the time steps for the Theta sketches.

For each column, the data job processor 406 determines the type of data as numerical data or categorical data and provides the data for the column to either the numerical sketch processor 408 or the categorical sketch processor 410 based on the type of data. The numerical sketch processor 408 can correspond to the numerical sketch processor 112 of FIG. 1 and operates to generate time series of Theta sketches for numerical data as described above with reference to the numerical sketch processor 112. The categorical sketch processor 410 can correspond to the categorical sketch processor 114 of FIG. 1 and operates to generate time series of Theta sketches for categorical data as described above with reference to the categorical sketch processor 114.

The Theta sketches generated by the numerical sketch processor 408 and the categorical sketch processor 410 are stored in the sketches data store 412 (which can correspond to the sketches data store 122 of FIG. 1). The stored sketches in the sketches data store 412 are used by query processor 414 (which can correspond to the query processor module 116 of FIG. 1) to process queries. When the query processor 414 receives a query 416 that include one or more predicates and a specified time period, the query processor 414 identifies individual predicates a time steps corresponding to the time period (e.g., time steps between a start event-time and an end event-time). For each predicate, the query processor 414 accesses the Theta sketches for the predicate for the time steps with the time period specified by the query. The query processor 414 combines the accessed Theta sketches to generate a result 418, which can be returned as a response to the query 416.

Example Methods for Approximate Query Processing using Time Series of Sketches

Figure 5:
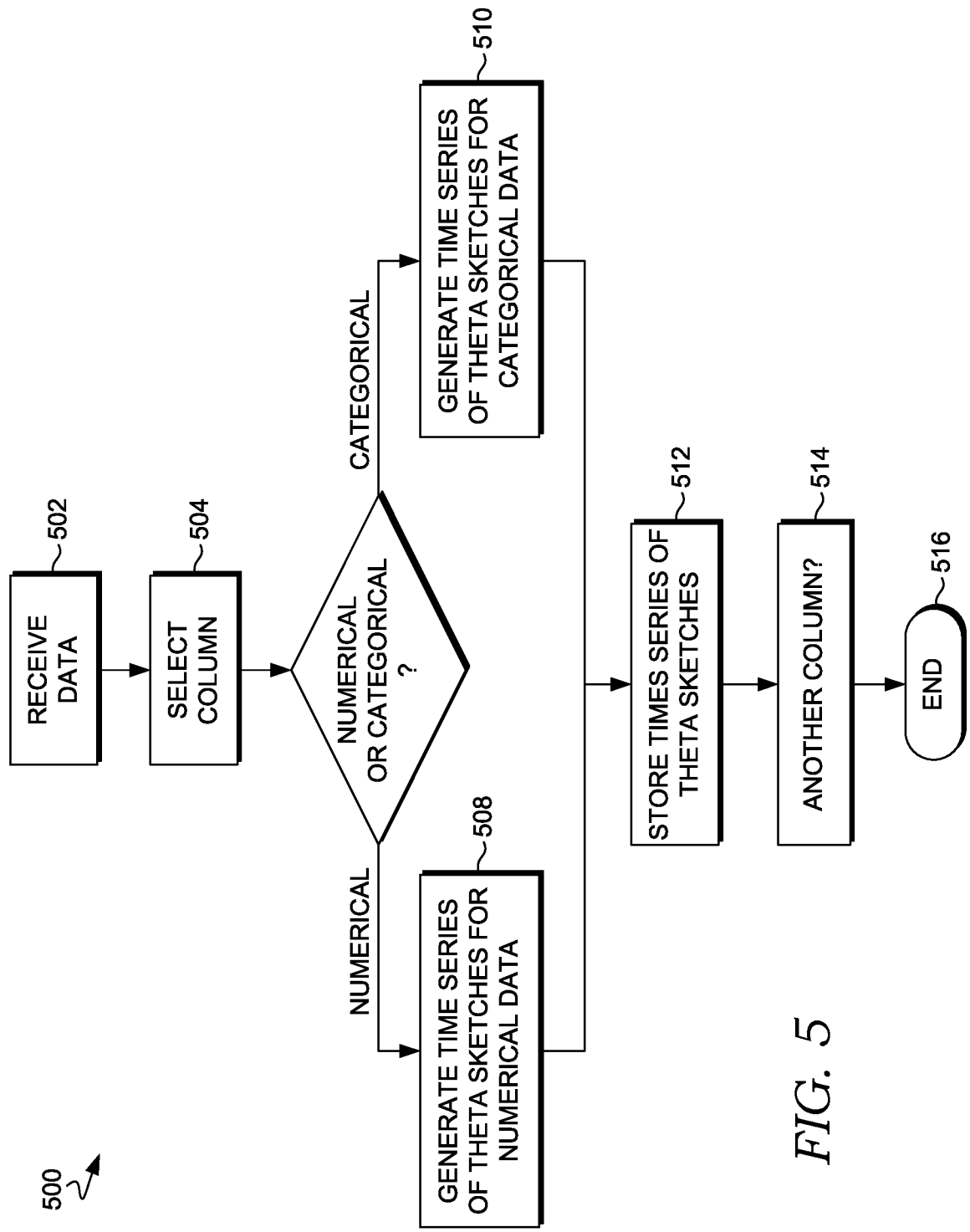
FIG. 5 is a flow diagram showing an overall method for processing data to generate a time series of sketches in accordance with some implementations of the present disclosure.

With reference now to FIG. 5, a flow diagram is provided that illustrates an overall method 500 for processing data to generate a time series of sketches. The method 500 can be performed, for instance, by the query processing system 104 of FIG. 1. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 502, data is accessed. The accessed data could comprise tabular data stored in a data store, such as the tabular data store 120 of FIG. 1. A column of the data is selected, as shown at block 504. A determination is made at block 506 whether the selected column comprises numerical data or categorical data, for instance, by analyzing the values stored in the column.

If the column comprises numerical data, a time series of sketches is generated over the numerical data, as shown at block 508. The time series of sketches for the numerical data can be performed, for instance, using the method 600 described below with reference to FIG. 6. Alternatively, if the column comprises categorical data, a time series of sketches is generated over the categorical data, as shown at block 510. The time series of sketches for the categorical data can be performed, for instance, using the method 700 described below with reference to FIG. 7. In either case, the time series of sketches is stored in a data store, such as the sketches data store 122 of FIG. 1. Each sketch can be stored with one or more identifiers that facilitate identifying the sketches for retrieval when processing queries.

A determination is made at block 514 regarding whether there are other columns from the data to process. If so, another column is selected at block 504 and processed to generate a time series of sketches for the data in the column. Once all columns have been processed, the process ends at block 516. While FIG. 5 illustrates an approach in which columns are processed serially, it should be understood that columns can be processed in parallel in accordance with some aspects of the technology described herein.

Figure 6:
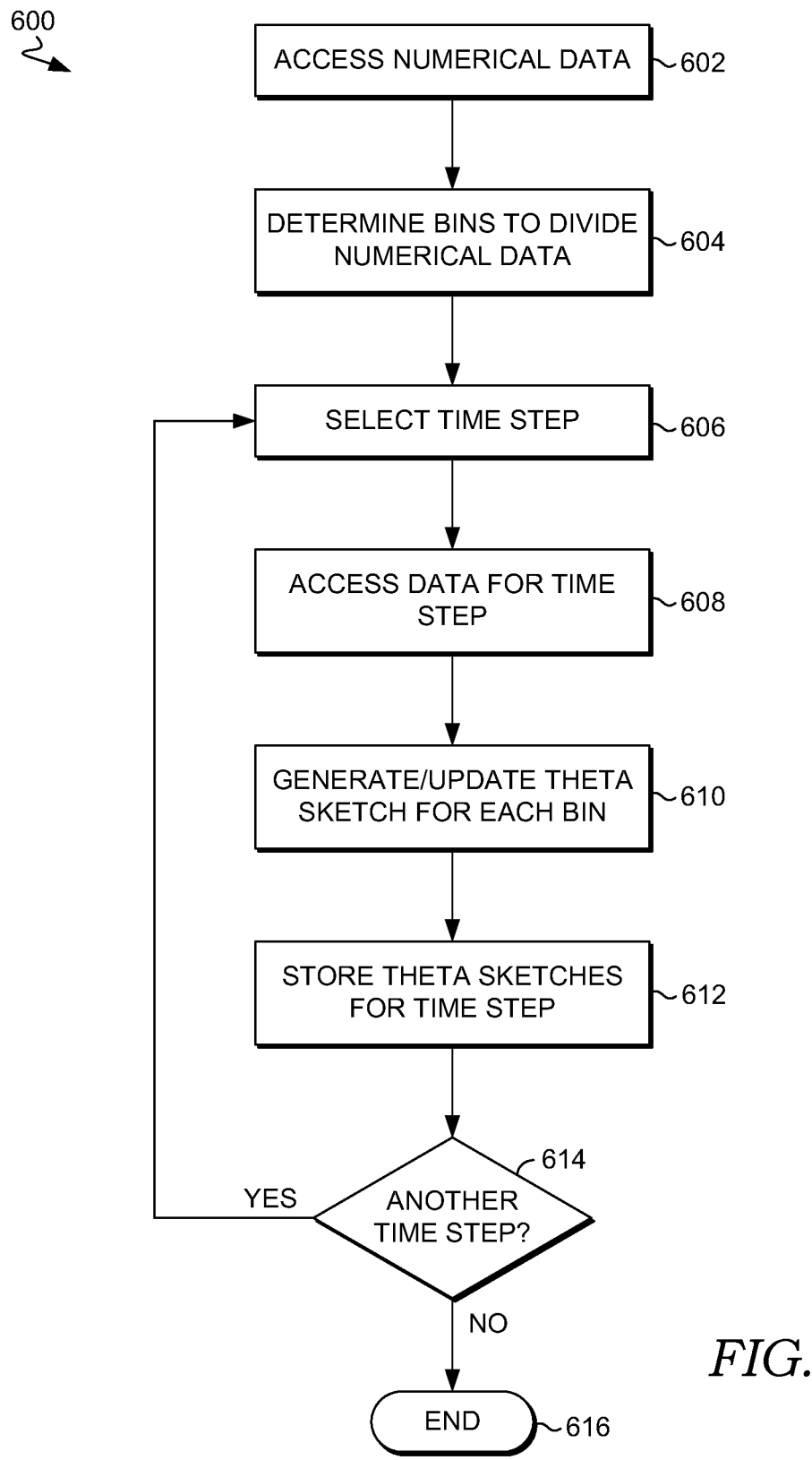
FIG. 6 is a flow diagram showing a method for processing a column of numerical data to generate a time series of sketches in accordance with some implementations of the present disclosure.

With reference next to FIG. 6, a flow diagram is provided showing a method 600 for processing a column of numerical data to generate a time series of sketches for the column. The method 600 can be performed, for instance, by the numerical sketch processor 112 of FIG. 1. As shown at block 602, numerical data from a column is accessed. Bins to divide the numerical data are determined at block 604. If this is the first batch of data being processed for this column, bin boundaries are established at block 604. If this is a subsequent batch of data being processed for this column, the bins can be determined at block 604 by referring to bin boundaries previously established for the column. In some instances, determining the bins includes determining bin boundaries for a first set of bins and also determining bin boundaries for a second set of bins using a delta value (i.e., delta bins). In some aspects, the bin boundaries are non-overlapping; while in other aspects, the bin boundaries are overlapping. As an example of the latter, a pre-fix sum approach is used is some aspects for establishing the bin boundaries such that the bin range of each bin is cumulative over previous bins.

A time step is selected at block 606, and data for the time step is accessed at block 608. The data for the time step comprises data from records having time information corresponding with that time step. For instance, if the time step is a given day, data for records with a time stamp corresponding with that day is accessed. A sketch is generated for each bin for the time step at block 610. If this is the first batch of data being processed for the column, generating the sketches at block 610 comprises generating new sketches over the data. If this is a subsequent batch of data being process for the column, generating the sketches at block 610 comprises updating previously generated sketches. In some aspects, the generated sketches comprise Theta sketches.

As shown at block 612, the sketches generated for each bin for the selected time step are stored in a data store, such as the sketches data store 122 of FIG. 1. The sketches are stored with one or more identifiers that facilitate retrieval of particular sketches for processing queries. For instance, each sketch can be identified by: a column identifier, a bin identifier, and a time step identifier.

A determination is made at block 614 regarding whether there are other time steps from the data to process. If so, another time step is selected at block 606 and data for the time step is processed to generate sketches for the time step. Once all time steps have been processed, the process ends at block 616. While FIG. 6 illustrates an approach in which time steps are processed serially, it should be understood that time steps can be processed in parallel in accordance with some aspects of the technology described herein.

Figure 7:
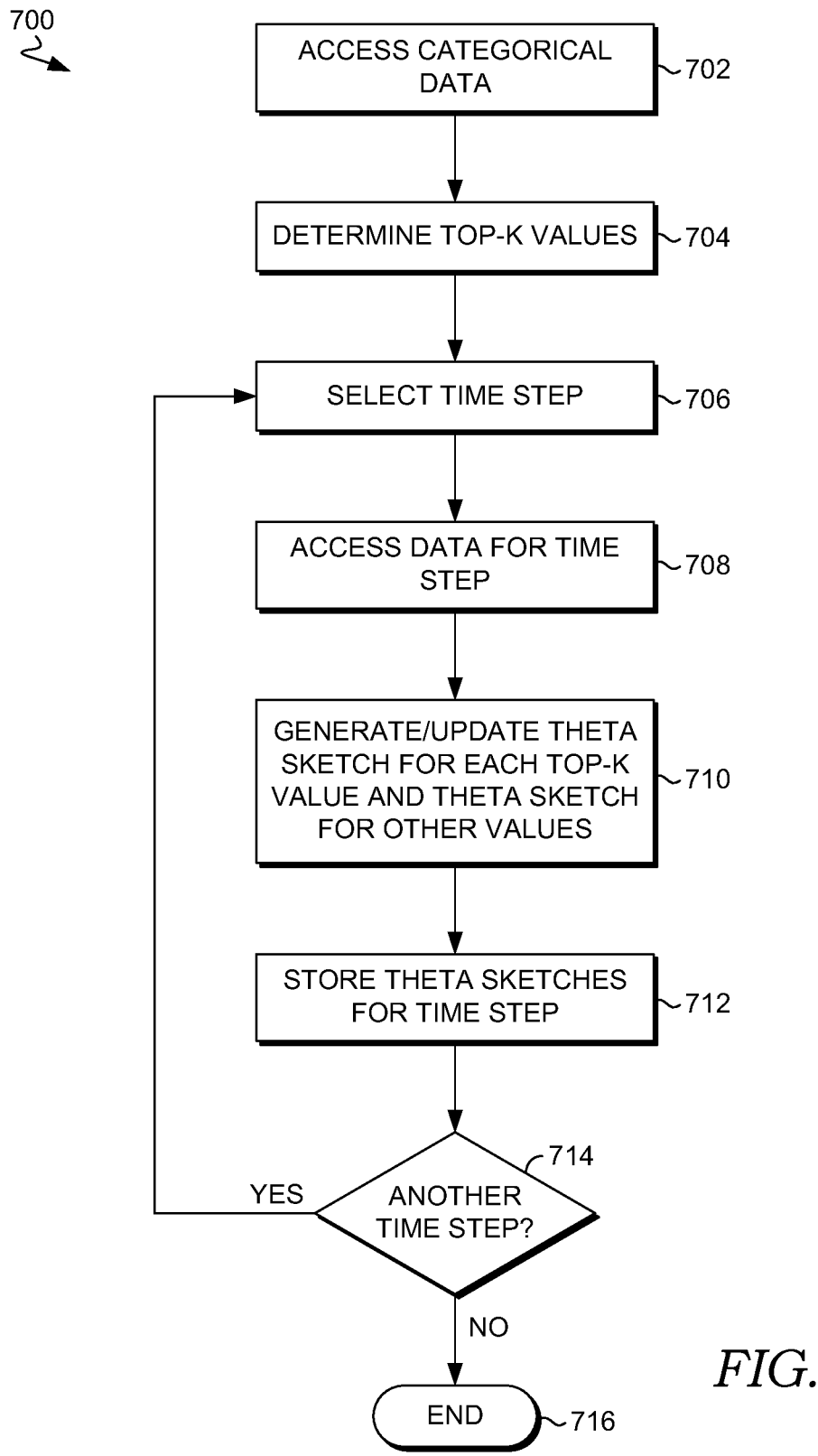
FIG. 7 is a flow diagram showing a method for processing a column of categorical data to generate a time series of sketches in accordance with some implementations of the present disclosure.

Referring next to FIG. 7, a flow diagram is provided showing a method 700 for processing a column of categorical data to generate a time series of sketches for the column. The method 700 can be performed, for instance, by the categorical sketch processor 114 of FIG. 1. As shown at block 702, categorical data from a column is accessed. The top-k most frequent values in the categorical data for the column are determined, as shown at block 704.

A time step is selected at block 706, and data for the time step is accessed at block 708. The data for the time step comprises data from records having time information corresponding with that time step. For instance, if the time step is a given day, data for records with a time stamp corresponding with that day is accessed. As shown at block 710, a sketch is generated for each value from the top-k values and a sketch is also generated for all other values (providing k+1 sketches) for the time step. If this is the first batch of data being processed for the column, generating the sketches at block 710 comprises generating new sketches over the data. If this is a subsequent batch of data being process for the column, generating the sketches at block 710 comprises updating previously generated sketches. In some aspects, the generated sketches comprise Theta sketches.

As shown at block 712, the sketches generated for each of the top-k values and the sketch for the other values for the selected time step are stored in a data store, such as the sketches data store 122 of FIG. 1. The sketches are stored with one or more identifiers that facilitate retrieval of particular sketches for processing queries. For instance, each sketch can be identified by: a column identifier, a value identifier, and a time step identifier.

A determination is made at block 714 regarding whether there are other time steps from the data to process. If so, another time step is selected at block 706 and data for the time step is processed to generate sketches for the time step. Once all time steps have been processed, the process ends at block 716. While FIG. 7 illustrates an approach in which time steps are processed serially, it should be understood that time steps can be processed in parallel in accordance with some aspects of the technology described herein. Additionally, while FIG. 7 illustrates an approach in which the top-k values are determined across time steps, in other aspects, the top-k values are determined at each time step such that the values in the top-k values can vary across time steps.

Figure 8:
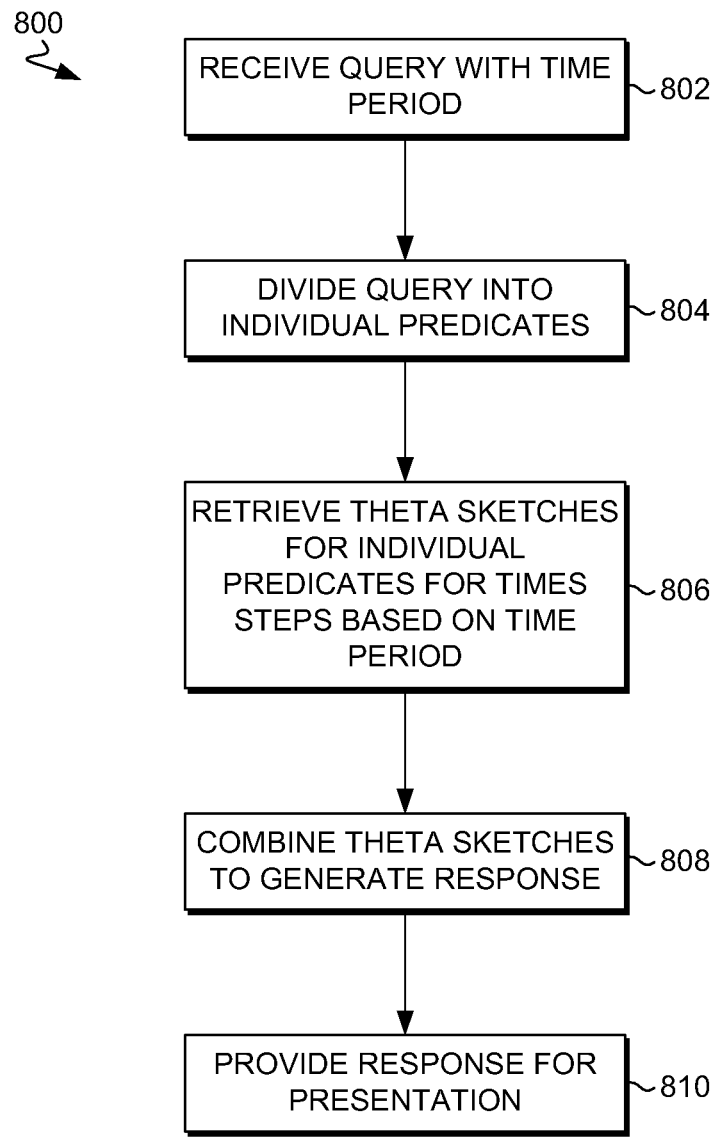
FIG. 8 is a flow diagram showing a method for generating a result for a query using a time series of sketches in accordance with some implementations of the present disclosure.

FIG. 8 is a flow diagram showing a method 800 for generating a result for a query using a time series of sketches, such as those generated in accordance with the methods 500, 600, and 700. As shown at block 802, a query is received. The query includes one or more predicates and specifies a time period. The query is divided into individual predicates, as shown at block 804. If the query is univariate, the single predicate of the query is identified at block 804.

As shown at block 806, sketches are retrieved for the individual predicates for time steps corresponding to the time period specified by the query. The sketches to retrieve for a given predicate are determined based on the attribute, operator, and value(s) of the predicate, as well as the bins (in the case of numerical data) or top-k values (in the case of categorical data) available in the sketches for the attribute of the predicate. For instance, in the case of the predicate "age<30", the predicate is "age", the operator is "<", and the value is "30". For this predicate, "age" sketches would be retrieved for each time step in the time period in order to generate a result for the predicate based on the predicate operator and value and the bins available for the "age" column. As an example, if a bin with bin boundaries of 0-30 is available for the "age" column, the sketch for that bin would be retrieved for each time step. Alternatively, if different bin boundaries are used, multiple sketches may be retrieved at each time step.

A result is determined from the retrieved sketches, as shown at block 808. In some aspects, an intermediate sketch is provided for each individual predicate based on one or more sketches obtained for each predicate, and the intermediate predicates are combined in accordance with how the predicates are combined in the query. For example, the combination of intermediate sketches for individual predicates can involve taking an intersection between intermediate sketches when the query uses an 'AND' operator or taking a union between intermediate sketches when the query uses an 'OR' operator. As shown at block 810, a response to the query based on the determined result is provided for presentation.

Exemplary Operating Environment

Figure 9:
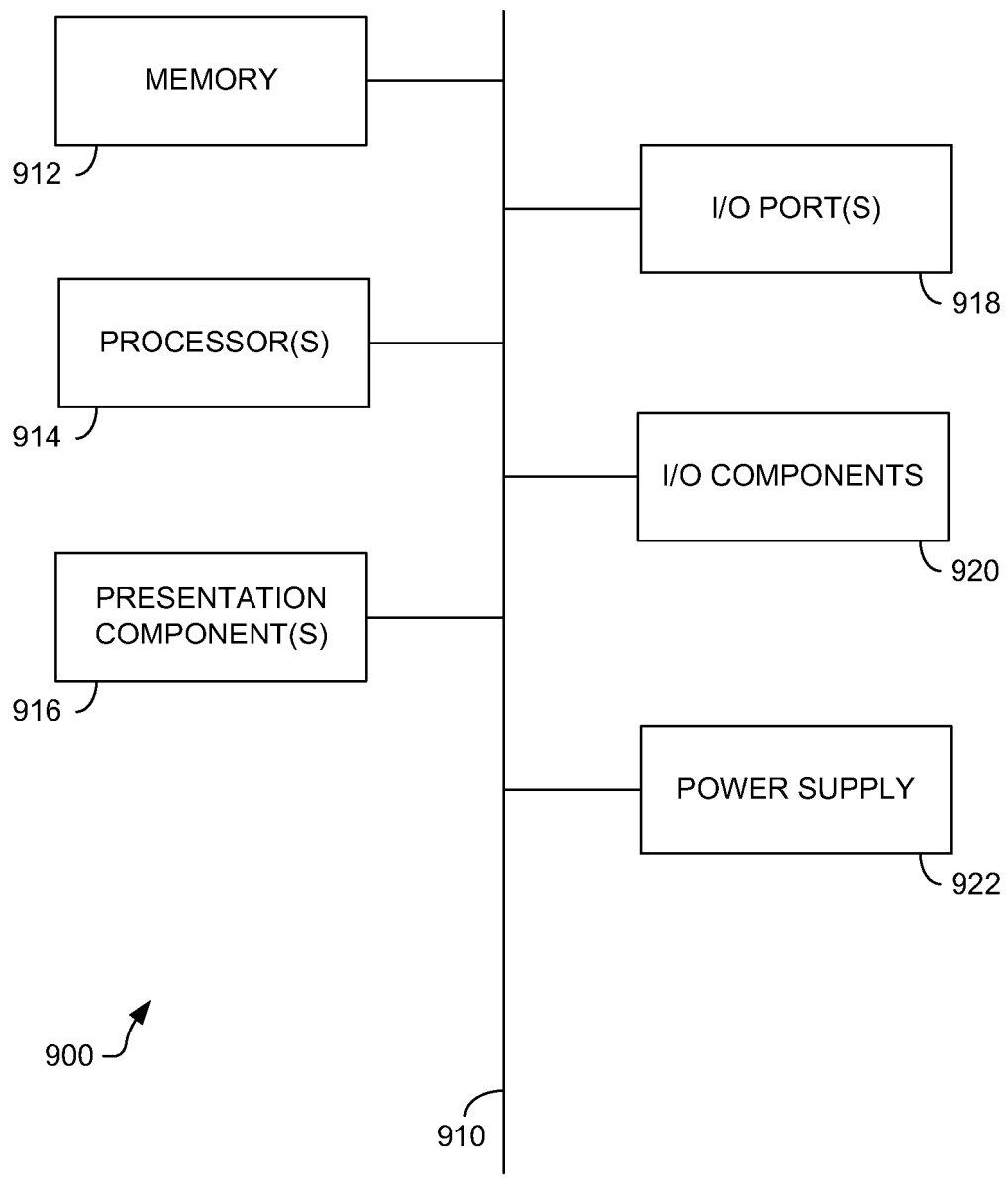
FIG. 9 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 9 in particular, an exemplary operating environment for implementing embodiments of the present technology is shown and designated generally as computing device 900. Computing device 900 is but one example of a suitable computing environment and is not intended to suggest any limitation as to the scope of use or functionality of the technology. Neither should the computing device 900 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what can be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. The terms "computer storage media" and "computer storage medium" do not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory can be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which can be built in. Illustrative components include a microphone, joystick, game pad, satellite dish, scanner, printer, wireless device, etc. The I/O components 920 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 900. The computing device 900 can be equipped with depth cameras, such as, stereoscopic camera systems, infrared camera systems, RGB camera systems, and combinations of these for gesture detection and recognition. Additionally, the computing device 900 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations, the operations comprising:
   accessing tabular data having a plurality of records and a plurality of columns;
   responsive to identifying a first column from the plurality of columns as comprising numerical data, generating sketches for the numerical data for each of a plurality of time steps and storing the sketches for the numerical data in a computer storage device as a first time series of sketches;
   responsive to identifying a second column from the plurality of columns as comprising categorical data, generating sketches for the categorical data for each of the plurality of time steps and storing the sketches for the categorical data in the computer storage device as a second time series of sketches;
   receiving, by a user interface component, a query comprising a first predicate, a second predicate, and a time period;
   generating a response to the query using at least a portion of the first time series of sketches and/or and at least a portion of the second time series of sketches, wherein generating the response to the query comprises:
      determining a plurality of time steps for the time period specified by the query,
      dividing the query into the first predicate corresponding to the numerical data and the second predicate corresponding to the categorical data,
      accessing, from the first time series of sketches stored in the computer storage device, a first set of sketches for the first predicate and the plurality of time steps,
      accessing, from the second time series of sketches stored in the computer storage device, a second set of sketches for the second predicate and the plurality of time steps, and
      generating the response using the first set of sketches and the second set of sketches; and
   providing the response via the user interface component.

2. The one or more computer storage media of claim 1, wherein the sketches for the numerical data are generated for each time step by:
   determining a plurality of bins for dividing the numerical data;
   accessing data from the first column for a subset of records corresponding to the time step; and
   generating a sketch for each bin using the data from the first column for the subset of records corresponding to the time step.

3. The one or more computer storage media of claim 2, wherein determining the plurality of bins comprises:
   identifying a minimum value and a maximum value in the numerical data for the first column;
   determining a bin width based on the minimum value, the maximum value, and a number of bins, and
   determining value ranges for a first set of bins using the bin width.

4. The one or more computer storage media of claim 3, wherein determining the plurality of bins further comprises:
   determining value ranges for a second set of bins using the value ranges for the first set of bins and a delta value.

5. The one or more computer storage media of claim 1, wherein the sketches for the categorical data are generated for each time step by:
   identifying, from a plurality of values in the categorical data, a subset of top frequency values,
   accessing data from the second column for a subset of records corresponding to the time step;
   generating a sketch for each value from the subset of top frequency values using the data from the second column for the subset of records corresponding to the time step; and
   generating a sketch for all other values in the categorical data that are not in the subset of top frequency values using the data from the second column for the subset of records corresponding to the time step.

6. The one or more computer storage media of claim 5, wherein the top frequency values are identified by generating an item sketch to approximate a frequency with which each value from the plurality of values appears in the categorical data.

7. The one or more computer storage media of claim 1, wherein storing the sketches for the numerical data as the first time series of sketches comprises storing, for each sketch, a column identifier, a bin identifier, and a time step identifier.

8. The one or more computer storage media of claim 1, wherein storing the sketches for the numerical data as the first time series of sketches comprises storing, for each sketch, a column identifier, a value identifier, and a time step identifier.

9. The one or more computer storage media of claim 1, wherein the response is generated by:
   generating a first intermediate sketch from the first set of sketches;
   generating a second intermediate sketch from the second set of sketches; and
   combining the first intermediate sketch and the second intermediate sketch according to an operator between the first predicate and the second predicate in the query.

10. A computer-implemented method comprising:
   accessing, by a data job processor, a first column of data comprising numerical data from a tabular dataset,
   generating, by a numerical sketch processor, sketches for the numerical data for each of a plurality of time steps and storing the sketches for the numerical data in a computer storage medium as a first time series of sketches, the sketches for the numerical data for each time step being generated by:
      determining a plurality of bins for dividing the numerical data,
      accessing data from the first column for a subset of records corresponding to the time step, and
      generating a sketch for each bin using the data from the first column for the subset of records corresponding to the time step;
   accessing, by the data job processor, a second column of data comprising categorical data from the tabular dataset;

generating, by a categorical sketch processor, sketches for the categorical data for each of the plurality of time steps and storing the sketches for the categorical data in the computer storage medium as a second time series of sketches, the sketches for the categorical data for each time step being generated by:
  identifying, from a plurality of values in the categorical data, a subset of top frequency values,
  accessing data from the second column for a subset of records corresponding to the time step,
  generating a sketch for each value from the subset of top frequency values using the data from the second column for the subset of records corresponding to the time step, and
  generating a sketch for all other values in the categorical data that are not in the subset of top frequency values using the data from the second column for the subset of records corresponding to the time step; and
responsive to a query received by a user interface component, generating, by a query processor, a result using at least a portion of the first time series of sketches and at least a portion of the second time series of sketches stored in the computer storage medium; and
providing, by the user interface component, the result for display.

11. The computer-implemented method of claim 10, wherein determining the plurality of bins for dividing the numerical data comprises:
  identifying a minimum value and a maximum value in the numerical data for the first column;
  determining a bin width based on the minimum value, the maximum value, and a number of bins, and
  determining value ranges for a first set of bins using the bin width.

12. The computer-implemented method of claim 11, wherein determining the plurality of bins for dividing the numerical data further comprises:
  determining value ranges for a second set of bins using the value ranges for the first set of bins and a delta value.

13. The computer-implemented method of claim 10, wherein the top frequency values for the categorical data are identified by generating an item sketch to approximate a frequency with which each value from the plurality of values appears in the categorical data.

14. The computer-implemented method of claim 10, wherein the result for the query is generated by:
  determining a plurality of time steps for a time period specified by the query;
  dividing the query into a first predicate corresponding to the numerical data and a second predicate corresponding to the categorical data;
  accessing, from the first time series of sketches, a first set of sketches for the first predicate and the plurality of time steps;
  accessing, from the second time series of sketches, a second set of sketches for the second predicate and the plurality of time steps; and
  generating the result using the first set of sketches and the second set of sketches.

15. The computer-implemented method of claim 14, wherein the result is generated by:
  generating a first intermediate sketch from the first set of sketches;
  generating a second intermediate sketch from the second set of sketches; and
  combining the first intermediate sketch and the second intermediate sketch according to an operator between the first predicate and the second predicate in the query.

16. A computer system comprising:
  a processor; and
  a computer storage medium storing computer-useable instructions that, when used by the processor, causes the computer system to perform operations comprising:
  accessing tabular data having a plurality of records and a plurality of columns;
  responsive to identifying a first column from the plurality of columns as comprising numerical data, generating sketches for the numerical data for each of a plurality of time steps and storing the sketches for the numerical data in a computer storage device as a first time series of sketches;
  responsive to identifying a second column from the plurality of columns as comprising categorical data, generating sketches for the categorical data for each of the plurality of time steps and storing the sketches for the categorical data in the computer storage device as a second time series of sketches;
  receiving, by a user interface component, a query comprising a first predicate, a second predicate, and a time period;
  generating a response to the query using at least a portion of the first time series of sketches and at least a portion of the second time series of sketches, wherein generating the response to the query comprises:
    dividing, by a query processor, the query into the first predicate and the second predicate,
    retrieving, by the query processor, a first set of sketches stored in the computer storage device for the first predicate and a plurality of times steps corresponding to the time period,
    retrieving, by the query processor, a second set of sketches stored in the computer storage device for the second predicate and the plurality of time steps, and
    generating, by the query processor, a result from the first set of sketches and the second set of sketches; and
  providing, by the user interface component, a response to the query based on the result.

17. The computer system of claim 16, wherein the result is generated by:
  generating a first intermediate sketch from the first set of sketches;
  generating a second intermediate sketch from the second set of sketches; and
  combining the first intermediate sketch and the second intermediate sketch according to an operator combining the first predicate and the second predicate in the query.

18. The computer system of claim 17, wherein the operator combining the first predicate and the second predicate in the query comprises an AND operator, and wherein the result is generated by taking an intersection between the first intermediate sketch and the second intermediate sketch.

19. The computer system of claim 17, wherein the operator combining the first predicate and the second predicate in the query comprises an OR operator, and wherein the result is generated by taking a union between the first intermediate sketch and the second intermediate sketch.

* * * * *